(12) United States Patent
Rosselli et al.

(10) Patent No.: US 12,307,002 B2
(45) Date of Patent: May 20, 2025

(54) REGISTER SHIELDING IN SEMICONDUCTOR DEVICES

(71) Applicant: STMICROELECTRONICS S.r.l., Agrate Brianza (IT)

(72) Inventors: Salvatore Marco Rosselli, Catania (IT); Giuseppe Guarnaccia, San Gregorio di Catania (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 232 days.

(21) Appl. No.: 17/882,400

(22) Filed: Aug. 5, 2022

(65) Prior Publication Data
US 2023/0055842 A1    Feb. 23, 2023

(30) Foreign Application Priority Data
Aug. 17, 2021   (IT) .................. 102021000021944

(51) Int. Cl.
| | | |
|---|---|---|
| *G06F 21/76* | (2013.01) | |
| *G06F 21/60* | (2013.01) | |
| *G06F 21/74* | (2013.01) | |
| *G06F 21/79* | (2013.01) | |

(52) U.S. Cl.
CPC ............ *G06F 21/76* (2013.01); *G06F 21/604* (2013.01); *G06F 21/74* (2013.01); *G06F 21/79* (2013.01)

(58) Field of Classification Search
CPC ........ G06F 21/76; G06F 21/604; G06F 21/79; G06F 21/74
See application file for complete search history.

(56) References Cited

U.S. PATENT DOCUMENTS

| | | | |
|---|---|---|---|
| 8,621,597 B1 * | 12/2013 | Jenkins, IV | H03K 19/17768 726/14 |
| 2003/0233524 A1 | 12/2003 | Poisner | |
| 2007/0086257 A1 * | 4/2007 | Bernier | G06F 21/554 340/568.1 |
| 2008/0005586 A1 | 1/2008 | Munguia | |
| 2011/0182101 A1 * | 7/2011 | Bae | G11C 17/18 365/163 |
| 2017/0160972 A1 * | 6/2017 | Kodera | G11C 7/1063 |

FOREIGN PATENT DOCUMENTS

WO    WO-2018104711 A1 *  6/2018  ......... G06F 12/1416

* cited by examiner

*Primary Examiner* — Ellen Tran
(74) *Attorney, Agent, or Firm* — Seed IP Law Group LLP (57) ABSTRACT

A semiconductor device comprises one or more registers having digital signals stored therein. The semiconductor device is configured for communication with one or more external devices and such communication may involve requests for access to portions of these register or registers. Register shield circuitry is provided comprising access detection circuitry configured to detect requests for access to these register portions in communication with the external device or devices. The register shield circuitry is configured to be selectively activated in a register shield mode to shield these register portions from undesired requests for access. When activated in the register shield mode, the register shield circuitry prevents access to these register portions in response to requests for access detected by the access detection circuitry.

25 Claims, 8 Drawing Sheets

REGISTER SHIELDING IN SEMICONDUCTOR DEVICES

BACKGROUND

Technical Field

The description relates to semiconductor devices.

One or more embodiments can be applied to a variety of products such as, for instance, microcontrollers or microprocessors.

Description of the Related Art

A digital system on chip (SoC) such as a general-purpose (GP) microcontroller or microprocessor comprises a large set of digital IP cores (IPs).

The designation IP (intellectual property) core—briefly, IP core or simply IP—applies to a block of logic or data that can be used in producing a circuit such as a field programmable gate array (FPGA) or an application-specific integrated circuit (ASIC) for a product.

IPs can be very complex and support many features.

Certain IPs can be designed to operate only in particular contexts and may become useless, or even harmful, in other contexts. For instance, an IP designed for a microcontroller unit (MCU) may not be adequate for a microprocessor unit (MPU) and/or an IP designed for a certain customer may not be compatible for use with old firmware, and so on.

One might consider addressing these issues by physically preventing some registers from being instantiated in a certain device design. However, contingencies may arise where "silicon is out" (for instance, the related device is already in production) so that it is simply too late to implement such an intervention. Being able to selectively disable/prevent undesired or "buggy" operation features without re-designing a circuit would be advantageous.

BRIEF SUMMARY

In an embodiment, a semiconductor device comprises: a set of registers, which, in operation, store digital data; an interface coupled to the set of registers, wherein the interface, in operation, receives external requests to access registers of the set of registers; and selectively-activateable register shield circuitry, coupled between the interface and the set of registers. The register shield circuitry, once activated, intercepts requests received by the interface and directed to a register of the set of registers; determines whether an intercepted request is directed to a portion of a register of the set of registers to which access is prohibited; and responds to a determination that the intercepted request is directed to a portion of a register of the set of registers to which access is prohibited by preventing access to data stored in the portion of the register of the set of registers.

In an embodiment, a method comprises: determining whether registry shield circuitry coupled between an interface of an integrated circuit and a set of registers of the integrated circuit has been activated; in response to a determination that the registry shield circuitry has been activated: intercepting requests received by the interface and directed to a register of the set of registers; determining whether an intercepted request is directed to a portion of a register of the set of registers to which access is prohibited; and responding to a determination that the intercepted request is directed to a portion of a register of the set of registers to which access is prohibited by preventing access to data stored in the portion of the register of the set of registers; and in response to a determination that the registry shield circuitry has not been activated, responding to requests received by the interface and directed to a register of the set of registers by accessing the register of the set of registers.

In an embodiment, a system comprises: a plurality of processing circuits, each including a set of registers, wherein the registers, in operation, store data; one or more interfaces, which, in operation, receive requests to access registers of the plurality of processing circuits; and a plurality of registry shield circuits coupled between processing circuits of the plurality of processing circuits and interfaces of the one or more interfaces, the plurality of registry shield circuits including a set of activated registry shield circuits and a set of unactivated registry shield circuits. An activated registry shield circuit of the set of activated registry shield circuits, in operation: intercepts received requests directed to registers of processing circuits coupled to the activated registry shield circuit; determines whether an intercepted request is directed to a portion of a register to which access is prohibited; and responds to a determination that the intercepted request is directed to a portion of a register to which access is prohibited by preventing access to data stored in the portion of the register. An unactivated registry shield circuit of the set of unactivated registry shield circuits, in operation, forwards received requests directed to registers of processing circuits coupled to the unactivated registry shield circuit to the respective processing circuits.

In an embodiment, a non-transitory computer-readable medium's contents configure registry shield circuitry of an integrated circuit to perform a method, wherein the registry shield circuitry is coupled between an interface of an integrated circuit and a set of registers of the integrated circuit. The method comprises: determining whether the registry shield circuitry has been activated; in response to a determination that the registry shield circuitry has been activated: intercepting requests received by the interface and directed to a register of a set of registers; determining whether an intercepted request is directed to a portion of a register of the set of registers to which access is prohibited; and responding to a determination that the intercepted request is directed to a portion of a register of the set of registers to which access is prohibited by preventing access to data stored in the portion of the register of the set of registers.

BRIEF DESCRIPTION OF THE SEVERAL VIEWS OF THE DRAWINGS

One or more embodiments will now be described, by way of example only, with reference to the annexed figures, wherein.

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

DETAILED DESCRIPTION

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment," "in one embodiment," or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

As discussed in the introductory portion of this description, a digital system on chip (SoC) such as a general-purpose (GP) microcontroller or microprocessor, comprises a large set of digital IP cores (IPs). IPs can be very complex and support many features.

Certain IPs can be designed to operate only in particular contexts and may become useless, or even harmful, in other contexts.

For instance, and merely by way of example:
an IP designed for a microcontroller unit (MCU) may not be adequate for a microprocessor unit (MPU),
an IP designed for a certain customer may not be compatible for use with old firmware, and/or
certain features adopted in old firmware may be intended to be discontinued in new firmware.

Figure 1:
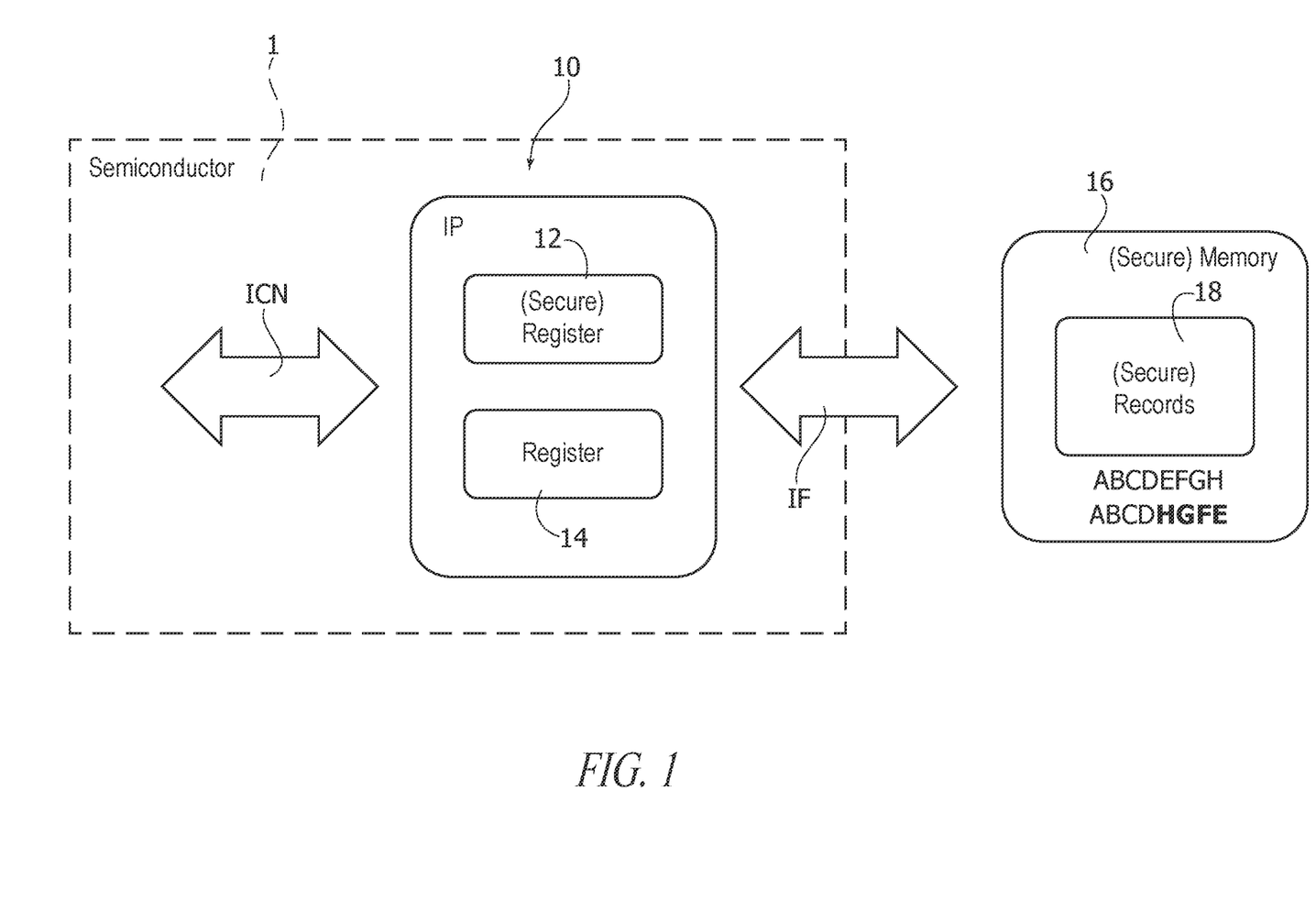
FIG. 1 is a block diagram exemplary of a context where embodiments can be advantageously applied.

In FIG. 1 a semiconductor device 1 such as a system-on-chip (SoC)—not visible in its entirety—is shown comprising a portion 10 (an IP including a secure peripheral, for instance) coupled to an interconnecting network ICN.

As illustrated, the device portion 10 comprises one or more registers 12. These may be, for instance, secure registers expected to be used in the current intended operation of the device.

Also, the device 1 may have loaded therein "legacy" code in an old, unprotected register 14. This code may end up by being useless or even obnoxious: for instance, it may alter "endianness," that is the order or sequence of bytes of a word of digital data in a memory.

By way of example, one may assume that the peripheral 10 of FIG. 1 is intended to interface via an interface IF with a secure external memory 16 that has stored therein secure records 18 (indicated ABCDEFGH for simplicity).

In a situation as portrayed in FIG. 1, hacking the endianness may result in user secure records being corrupted (ABCDEFGH>>>ABCDHGFE).

A situation as portrayed in FIG. 1 may arise, for instance, in circumstances where:
a feature to remap the external interface IF towards a memory 16 was designed and tested years ago on the peripheral 10 with that feature subsequently dropped from the specification but maintained, for some reasons, in an IP core as legacy code (stored in a register such as 14), and
the controller was selected for a new SoC, embedding new security features with a security specification that did not consider the presence of the (remaining) legacy code.

Design and verification teams involved in design the new SoC may note the presence of this legacy code and take measures to secure it, even if not stated in the specification.

The presence of the (no longer specified) legacy code may however go unnoticed with possible negative effects as discussed in the foregoing (old register unprotected, possible alteration of endianness and user secure records corrupted).

The presence of the (no longer specified) legacy code going unnoticed may be due to various factors, e.g.:
system complexity, with complexity producing errors; and/or
the legacy code is related to features that are not of interest for the user of the new system: by referring to the example of FIG. 1, the software remap feature can be completely unknown to the new customer, who is primarily concerned with data security.

These "unnecessary" features remaining in the system may however have an impact on features that really matter.

Also, some possible errors can be particularly unfortunate and require a completely new tape-out.

On the other hand, as noted, in certain circumstances (e.g., with silicon already "out," that is, with the corresponding semiconductor device already in production) it is simply too late to implement such an intervention.

FIG. 1 is thus generally exemplary of a context where embodiments can be advantageously applied, namely a semiconductor device 1 (an SoC, such as a microcontroller unit, MCU or a microprocessor unit, MPU, for instance) comprising registers 12 and 14 configured to have digital signals stored therein.

As illustrated, the semiconductor device 1 is configured (via the interface IF, for instance) for communication with at least one further device 16 (an external secure memory, for instance).

As discussed previously, for instance, the registers 12 may be secure registers to be used for the current intended operation of the device or conversely old, unprotected registers having loaded therein "legacy" code that is useless or even obnoxious.

During communication of the semiconductor device 1 with the further device or devices 16 the register or registers 14 may thus be exposed to access requests.

Figure 2:
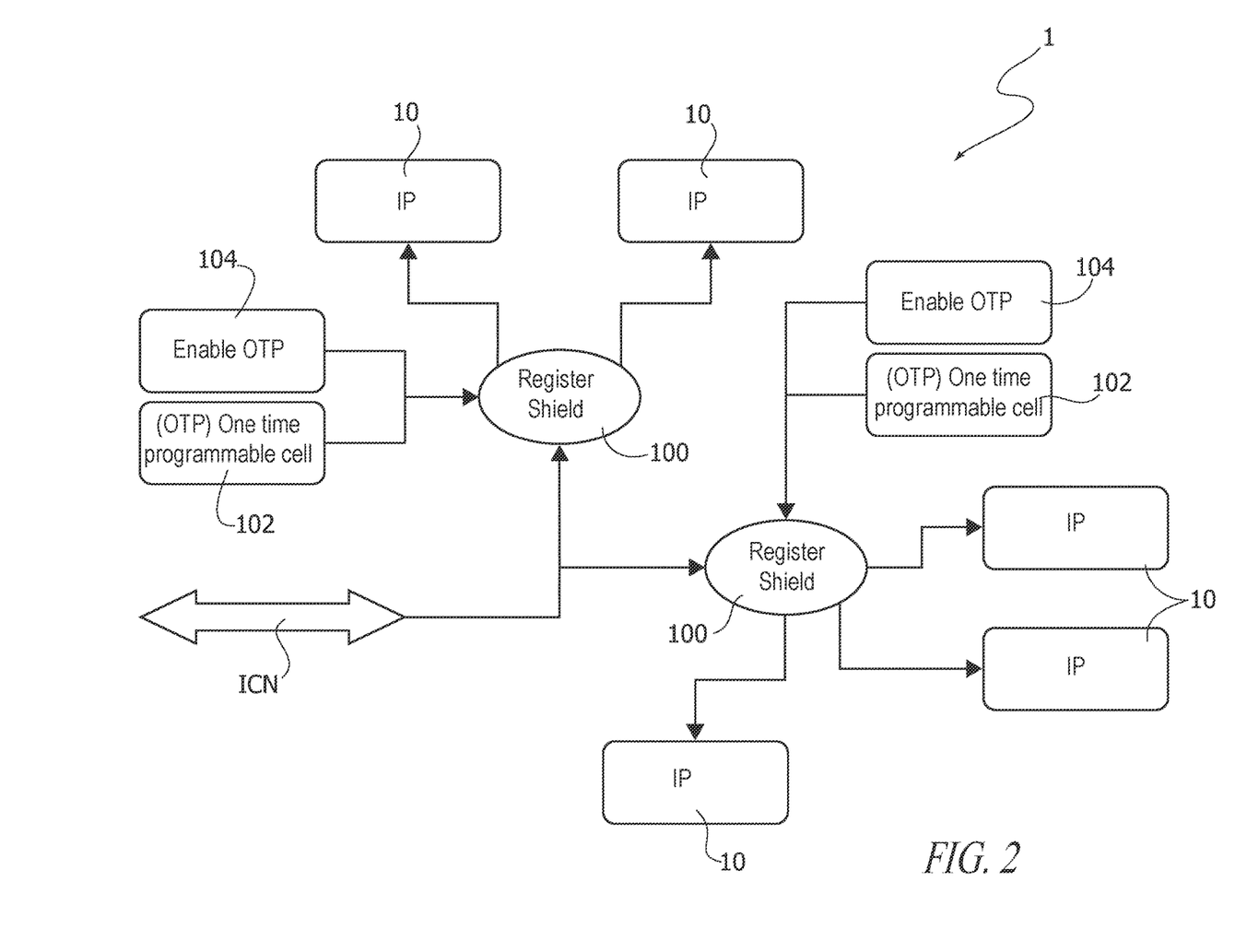
FIG. 2 is a functional diagram exemplary of possible implementations of embodiments of the present disclosure.

FIG. 2 is a functional diagram exemplary of possible embodiments involving the use of one or more register shields 100 to shield various instances of a peripheral 10 (e.g., registers such as the registers 14 included therein as exemplified in FIG. 1) from such access requests.

As further discussed in the following, the register shield circuit or circuits 100 coupled with the register or registers 14 comprise access detection circuitry 200 (see FIGS. 5 to 7) configured to detect access requests for access to the register(s) 14 during communication of the semiconductor device 1 with the device or devices 16.

The register shield circuitry 100 is configured to be selectively activated in a register shield operation mode to (completely) shield the register(s) 14 from these access requests.

When activated in the register shield mode, the register shield circuitry 100 prevents access to register or registers 14 in response to requests for access detected by the access detection circuitry.

In examples as discussed herein, the register shield(s) 100 cooperate with OTP (one-time programmable) cells 102 with associated enable OTP cell features 104.

A variety of conventional OTP implementations are currently known to those of skill in the art that can be advantageously applied in examples as presented herein. These examples are in fact largely "transparent" to the specific OTP implementations used.

Figure 3:
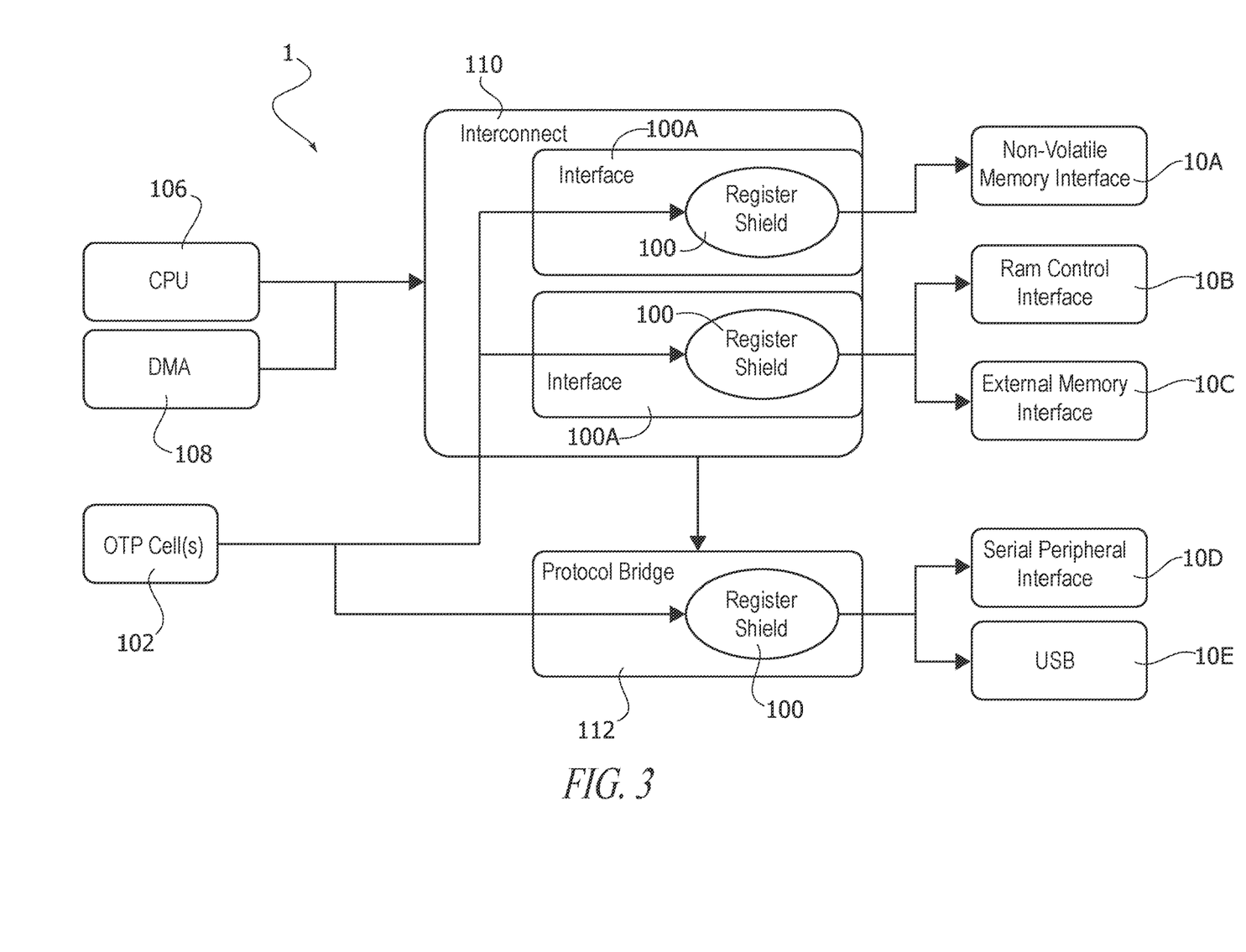
FIG. 3 is a block diagram exemplary of possible implementations of embodiments of the present disclosure.

FIG. 3 is a block diagram exemplary of possible implementation details of embodiments of the present disclosure.

As illustrated in FIG. 3, a register shield 100 can be implemented as a part of digital component active as a digital interface (e.g., interconnect, like Advanced Microcontroller Bus Architecture, AMBA interfaces or protocol bridges) in a system including centralized logic circuitry in an interconnect/bus matrix and/or protocol bridges.

A system as illustrated in FIG. 3 comprises a processing unit (a CPU, for instance) 106 with an associated direct memory access (DMA) circuitry 108 coupled via an interconnect/bus matrix 110 and, possibly, a protocol bridge 112, to various peripheral instances—as represented by reference 10 in FIG. 2.

These peripheral instances may include (merely by way of example):
a non-volatile memory interface 10A,
a random-access-memory (RAM) control interface 10B,
an external memory interface 10C,
a serial peripheral interface (SPI) 10D, and
a universal serial bus (USB) 10E.

As exemplified in FIG. 3, communication with the peripheral instances 10A, 10B, and 10C is via the interconnect/bus matrix 110 (with the register shields 100 representing particular bus/interconnect nodes or target interfaces 100A, for instance) and communication with the peripheral instances 10D and 10E involves the protocol bridge 112.

As illustrated, each register shield 100 has associated therewith a set of OTP cells, collectively indicated as 102 in FIG. 3.

These cells can be implemented, based on SoC specifications, as electronic fuses (e-fuses) metal options, proprietary cells, option bits in a non-volatile memory (NVM) and so on, as otherwise conventional in the art.

In practice, the register shields 100 can be regarded as enable switches and a set of "forbidden" register addresses. When such a switch is on (conductive) and a write access is detected towards one of the forbidden registers, the access is filtered out so that the data in the registers such as 14 are not exposed (as may be desired for various reasons as discussed in the foregoing).

These register shields 100 can be implemented as a feature in an existing interconnect node or target interface.

Figure 4:
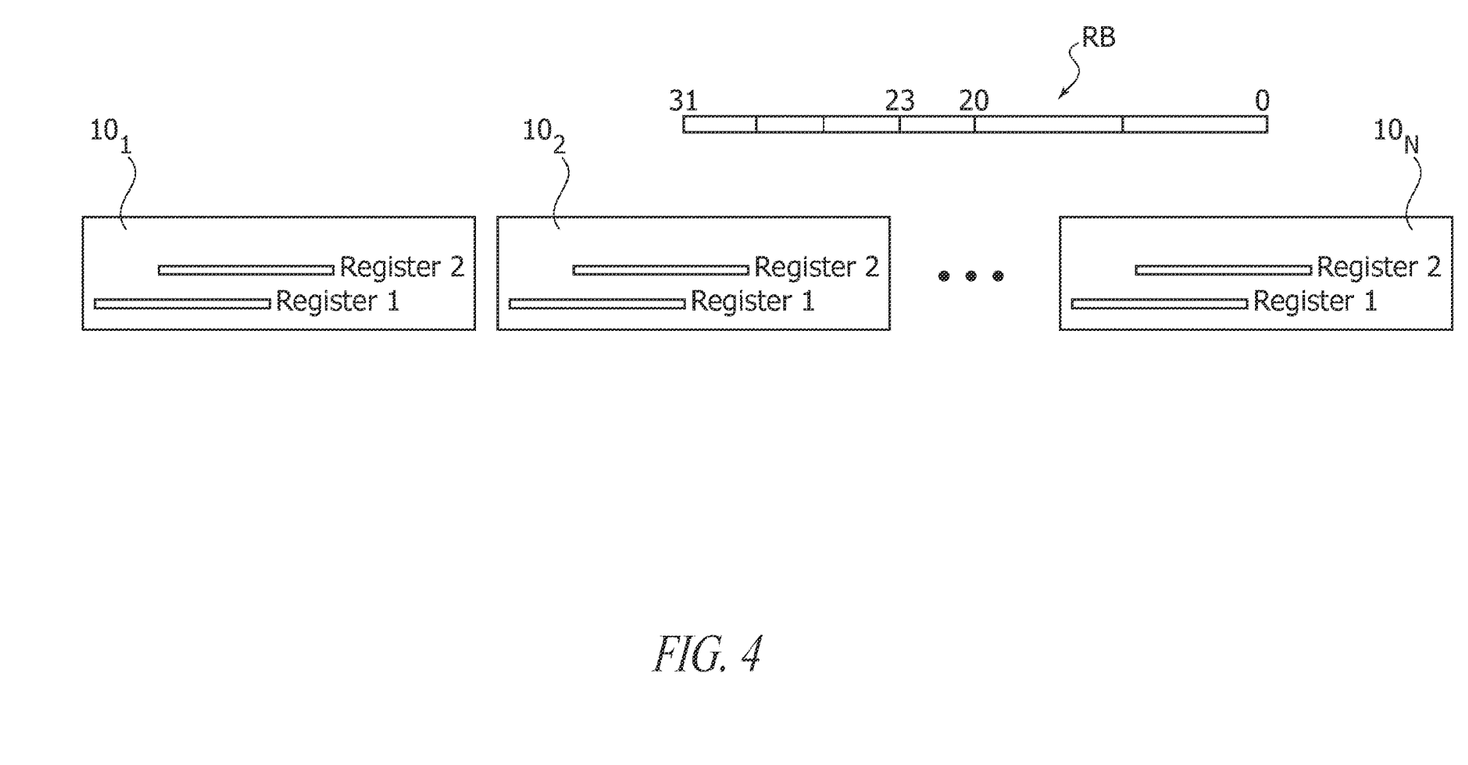
FIG. 4 is a diagram exemplary of a possible application of embodiments of the present disclosure.

FIG. 4 refers by way of example to a system comprising N peripheral instances 101 to 1 ON, each including two registers, Register 1 and Register 2, for instance. The bar RB represents the register bits that are protected.

N electronic fuses (e-fuses)—about 20 or 30 were found to be an adequate number—are used for selection (Peripheral/Register/nibble) for masking purposes.

For instance (these quantitative data are merely exemplary and non-limiting):
five bits will select the peripheral (e.g., peripheral 102);
ten bits will select the register (e.g., Register 2);
an 8-bit mask will select a 4-bit nibble to protect (bit 23:20, for instance); and
the mask can be applied to a plurality of fields or to the full register.

Figure 5:
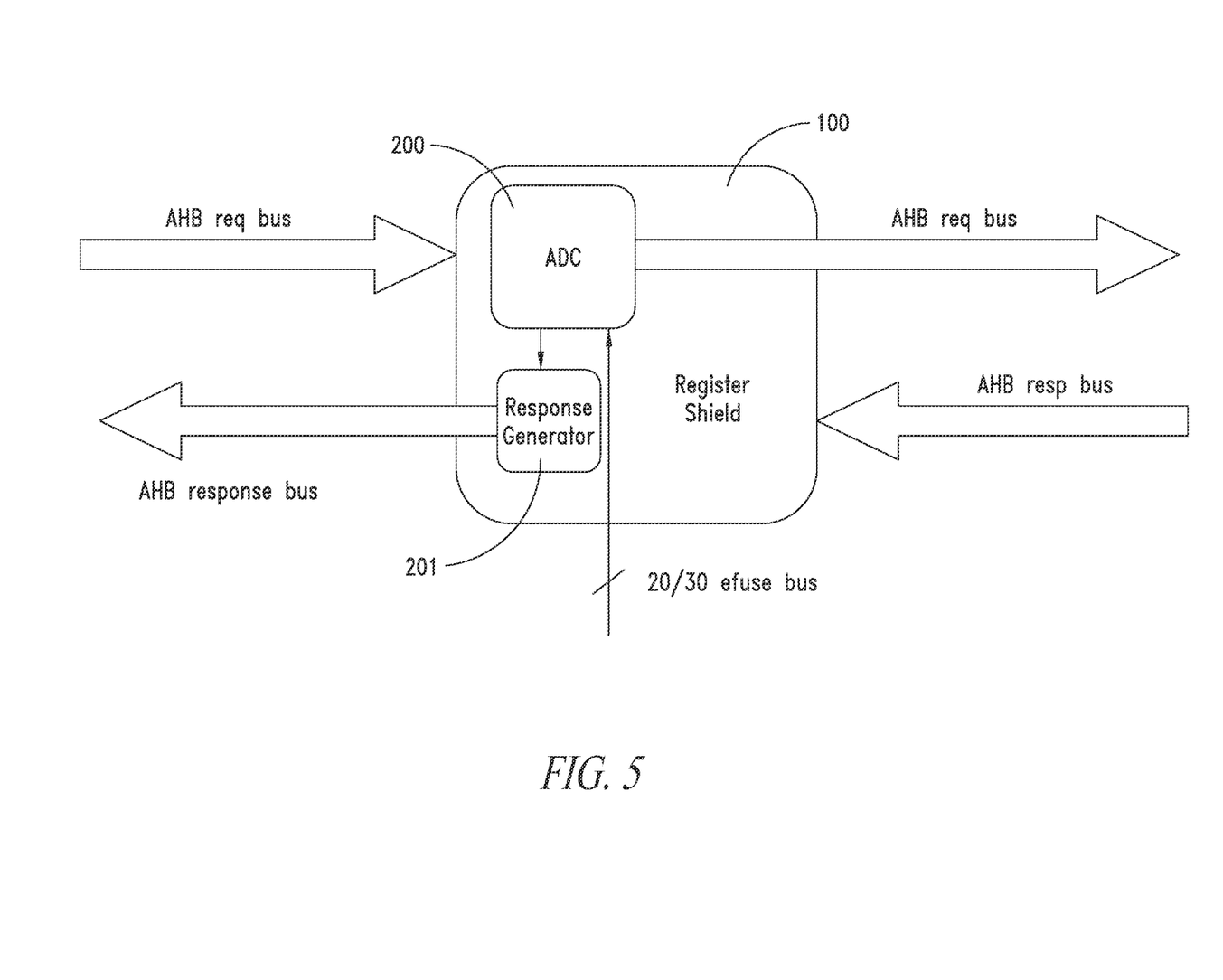
FIGS. 5, 6, and 7 are exemplary of possible implementation details of embodiments of the present disclosure.
Figure 6:
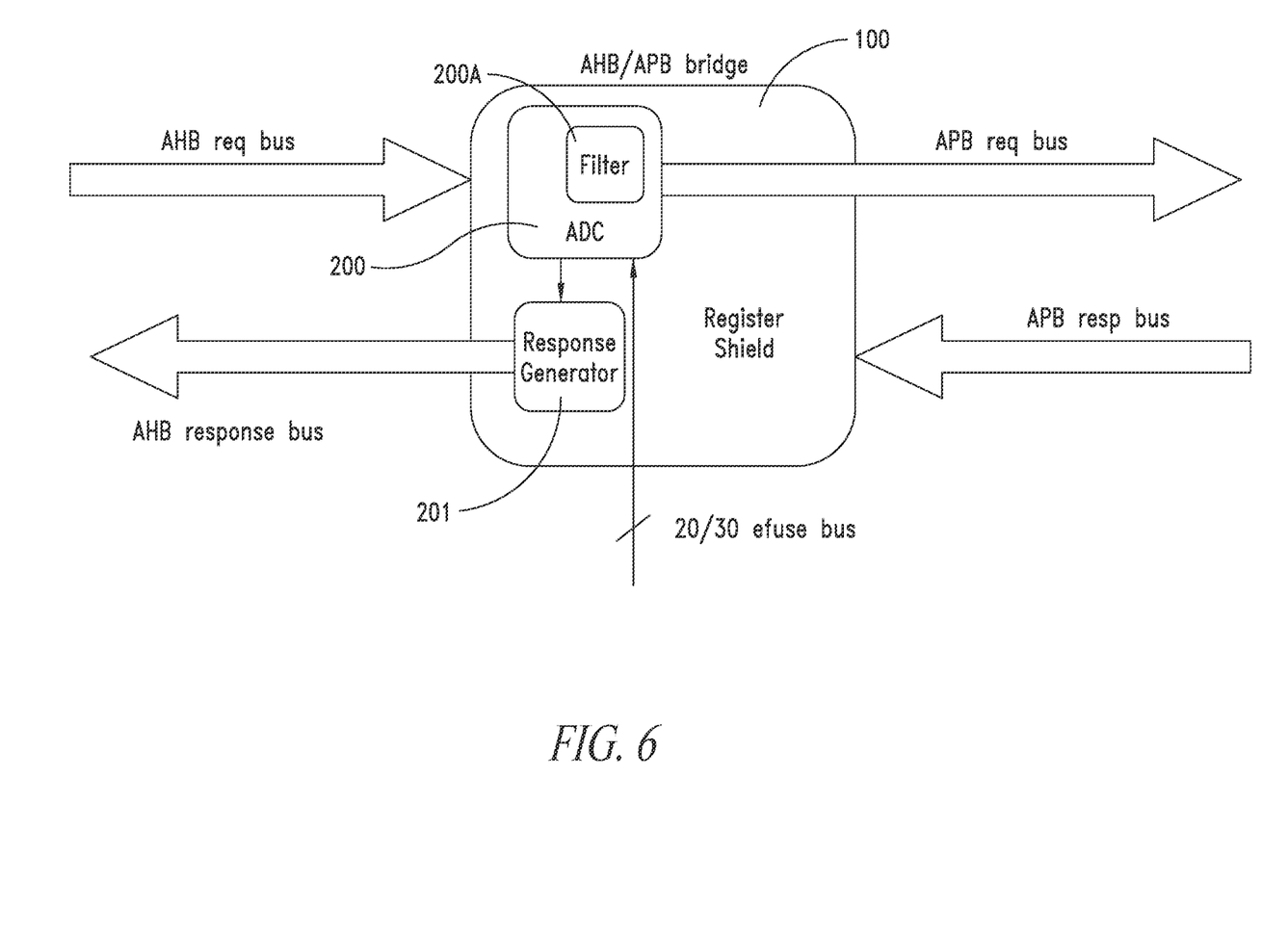
Figure 7:
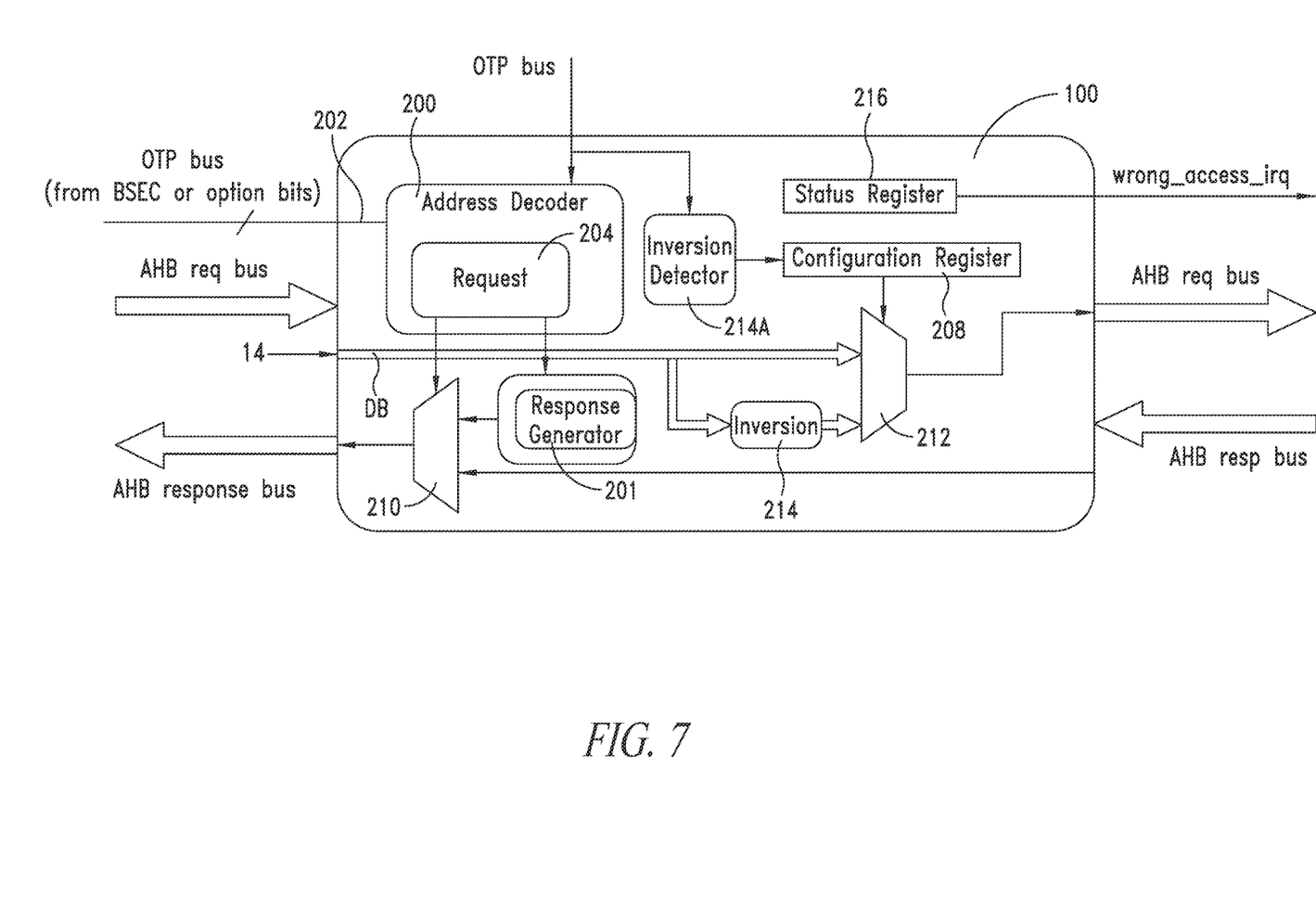

FIGS. 5, 6, and 7 illustrate a register shield 100 as exemplified herein implemented as a dedicated stand-alone module of an interconnect (e.g., Advanced Peripheral Bus, APB or Advanced High-performance Bus, AHB) comprising an address decoder 200 coupled, for instance, to a 20/30 e-fuse bus and a response generator 201.

Such a module can provide an error message or a fake response when a protected address is matched (that is when a "forbidden" register 14 is attempted to be accessed).

Such a module can be implemented as a sub-module of an interconnect bridge or decoder (AHB to APB, for instance).

Two possible implementations are illustrated in FIGS. 5 and 6.

FIG. 5 illustrates a possible implementation as a standalone component, made up of a decoding logic (the address decoder 200, possibly having associated therewith a filtering logic) and the response generator 201.

FIG. 6 illustrates a possible implementation where the address decoder 200 and the response generator 201 are common subblocks of interconnect components (like a protocol bridge). Such an implementation facilitates saving area and reducing complexity by integrating the filtering circuit block (expressly referenced as 200A) for the register shield in a same component as the (existing) address decoder 200.

FIG. 7 (which refers to the implementation of FIG. 5) illustrates the address decoder 200 coupled at an input 202 with the OTP bus (see also 102 in FIG. 3). This may be via a dedicated digital controller for OTP management, which facilitates programming and reading OTP cells under security constraints or via option bits.

The address decoder 200 can be configured to detect requests (indicated as 204) for access to a "forbidden" register as received over the AHB request bus.

The register shield reaction can be:
either an error message as generated in the response generation module 201,
or the shield 100 remaining silent.

The adopted option may be a function of the contents of a configuration register 208 coupled to the OTP bus (e-fuse bus).

The error message can be sent back over the AHB response bus in response to a request 204 for access to a "forbidden" register being detected by the address decoder 200.

This may occur via a multiplexer 210 controlled by the address decoder 200, the multiplexer 210 having a first input coupled to the response generation module 201 and a second input coupled to the input port of the AHB response bus to the shield 100.

A wrong access output/interrupt is thus used to alert the security system or to gate security information.

FIGS. 5 and 6 plus FIG. 7, as discussed so far, are thus illustrative of a semiconductor device 1 comprising one or more register portions (while an entire register 14 has been referred to herein for simplicity, the discussion identically applies only to a register portion) configured to have digital signals stored therein.

Figure 8:
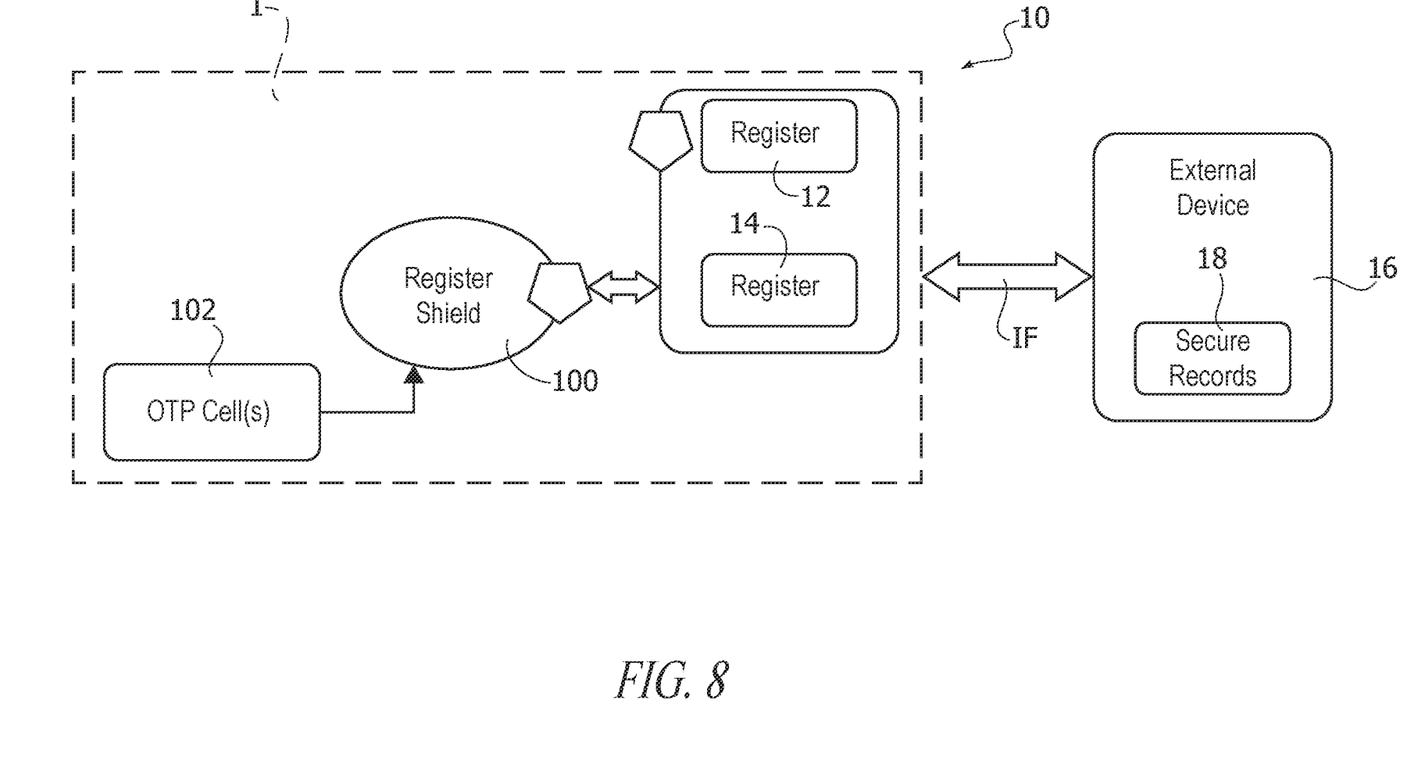
FIG. 8 is a block diagram exemplary of a possible context of use of embodiments.

The semiconductor device 1 is configured (see, for instance the references IF; 110, 112; 10A to 10E) for communication with at least one further device 16 external to the device 1 (see FIG. 8). During communication of the semiconductor device 1 with the device 16, certain "undesired" or "forbidden" register (portion) or portions 14 is/are exposed to access requests.

As discussed, the register shield circuitry 100 comprises access detection circuitry 200 configured to detect access requests for access to these register(s) 14 during communication of the semiconductor device 1 with the 16.

The register shield circuitry 100 is configured to be selectively activated, e.g., via the configuration register 208 (sensitive to configuration information as received, e.g., via the OTP bus) in a register shield mode.

When activated in the register shield mode, the register shield circuitry 100 prevents access to the register portions 14 in response to requests for access detected by the access detection circuitry 200.

A device as illustrated in FIGS. 5 and 6 plus FIG. 7, as discussed so far, lends itself to identifying one or more register portions 14 in the semiconductor device 1 configured to have stored therein digital signals intended to be excluded from communication with the device 16. This may be the case, for instance, of digital signals corresponding to a feature developed (exclusively) for one customer and/or to features that shall not be exposed to the mass market for legal reasons.

The register shield circuitry 100 coupled with the register portions 14 thus identified can be activated (under OTP control, for instance, as exemplified by reference 102) in the register shield mode.

When activated in the register shield mode, the register shield circuitry 100 shields (completely) the identified register portions 14 from the access requests, e.g., barring access in response to requests for access thereto as detected by the access detection circuitry 200.

Advantageously, as illustrated in FIG. 7, a further multiplexer 212 can be provided that is controlled by the configuration register 208.

The further multiplexer 212 has its output coupled to the output port of the AHB request bus.

Also, the further multiplexer 212 has a first input coupled to a data bus DB (this can be assumed to be from the "critical" register portions 14) into the shield 100 and a second input coupled to an inversion block 214 that can be used to invert specific data bits on the bus DB under the control of the configuration register 208.

Based on information read on the OTP bus supplied to the configuration register 208 via an inversion detector 214A, the inversion block 214 can be controlled by the configuration register 208 in order to invert certain bits in the data received over the data bus DB.

The inversion feature just discussed allows to configure the register shield circuitry 100 (under the control of the configuration register 208, in turn receptive of corresponding information over the OTP bus) in a register mask mode, that is, a sort of "leaky shield" mode.

When activated in the register mask mode, the register shield circuitry 100 per se allows access to the register portions 14 in response to requests for access thereto as detected by the access detection circuitry 200.

In that case, however, the "leaky" register shield circuitry applies (via the inversion block 214) a bit masking pattern to the data returned by the register portions 14, over the bus DB, in response to the requests for access.

As exemplified herein, such a bit masking pattern comprises logic inversion of selected bits (identified, e.g., via information provided on the OTP bus) in the data returned over the bus DB by the register portions 14 in response to the requests for access allowed by the "leaky" shield.

A device as illustrated FIG. 7 and including such an advantageous mask mode feature lends itself to identifying (further) register portions 14 configured to have stored therein digital signals intended to have a bit-masking pattern applied (e.g., in the inversion block 214) in communication with the device 16.

This may be, for instance, the case of data affected by an implementation error of one or more bits (considered with a wrong polarity, for instance).

In that case, there is no need to prevent exposure of the data per se (e.g., in its entirety). The advantageous mask mode feature however facilitates "fixed" operation.

Activating (e.g., via OTP control as exemplified at 102) the register shield circuitry 100 in the register mask mode results in the register shield circuitry 100 becoming "leaky" and allowing access to the further register portions 14 identified.

When in the register mask mode, the register shield circuitry 100 applies a bit masking pattern (e.g., via the inversion block 214) to data returned (e.g., over the bus DB) by the (further) register portions 14 identified in response to the requests for access that were allowed.

This can be controlled via the content of the configuration register 208, which is the result of processing of the OTP values as indicated by the OTP bus.

As illustrated in FIG. 7, a status register 216 stores information and details about the attempted/granted accesses and issues corresponding messages wrong_access_irq.

FIG. 8 shows, by direct comparison with FIG. 1 (corresponding parts or elements are indicated with corresponding reference symbols in both figures) that the behavior of the (each) register shield 100 is statically and structurally determined by the OTP cells 102. These can be provided directly on the final die.

For instance, in the presence of "legacy" code in an old, unprotected register 14 (which may undesirably produce corrupted data) or any vulnerability found to exist in the SoC 10, the situation can be remedied—without the intervention of a design team for a new tape-out or to re-design the system—by merely shielding out any "undesired" register such as the register 14.

In that way this register, even if "physically" present, may be finally regarded as non-existent due to the shielding action of the shield 100.

As discussed in connection with FIG. 7, certain examples may include an advantageous "leaky shield" feature. In that way, operation involving an absolute shielding action (no access requests allowed to "forbidden" register portions) may yield to a softer masking action, where access requests are allowed, with a masking pattern (e.g., logic inversion of selected bits) applied to the data returned in response to those requests.

Without prejudice to the underlying principles, the details and embodiments may vary, even significantly, with respect to what has been described by way of example only without departing from the extent of protection.

A semiconductor device (1) may be summarized as including at least one register portion (14) configured to have digital signals stored therein, wherein the semiconductor device (1) is configured (IF; 110, 112; 10A to 10E) for communication with at least one further device (16), wherein the at least one register portion (14) is exposed to access requests for access to the at least one register portion (14) during communication of the semiconductor device (1)

with the at least one further device (16), and register shield circuitry (100) coupled with the at least one register portion (14), the register shield circuitry (100) including access detection circuitry (200) configured to detect access requests for access to the at least one register portion (14) during communication of the semiconductor device (1) with the at least one further device (16), wherein the register shield circuitry (100) is configured to be selectively activated (208) in a register shield mode to shield the at least one register portion (14) from said access requests, wherein the register shield circuitry (100), when activated in said register shield mode, prevents access to said at least one register portion (14) in response to requests for access to the at least one register portion (14) detected by the access detection circuitry (200).

The semiconductor device (1) may include one-time-programmable, OTP cells (102, 104) configured to control activation of the register shield circuitry (100).

The one-time-programmable, OTP cells (102, 104) may be implemented as electronic fuses.

The semiconductor device (1) may be configured for communication with at least one further device (16) via interconnect circuitry (110) and the register shield circuitry (100) may be included in the interconnect circuitry (110).

The interconnect circuitry (110) may have an associated protocol bridge (112) and the device (1) may include register shield circuitry (100) included in said protocol bridge (112).

The register shield circuitry (100) may be included in an interconnect bridge or decoder in said interconnect circuitry (110).

The register shield circuitry (100) may be configured to be selectively activated (208) to a register mask mode wherein, when activated in said register mask mode, the register shield circuitry (100) may allow access to said at least one register portion (14) in response to requests for access to the at least one register portion (14) detected by the access detection circuitry (200) and may apply a bit masking pattern (214) to data (DB) returned in response to said requests for access by the at least one register portion (14).

Said bit masking pattern (214) may include logic inversion of selected ones (OTP bus) of the bits in the data (DB) returned by the at least one register portion (14) in response to said requests for access to the at least one register portion (14).

A method of operating a semiconductor device (1) may be summarized as including identifying at least one register portion (14) in the semiconductor device (1) configured to have stored therein digital signals intended to be excluded from communication with the at least one further device (16), and activating (102) in said register shield mode the register shield circuitry (100) coupled with the at least one identified register portion (14) identified wherein, when activated in said register shield mode, the register shield circuitry (100) shields the at least one identified register portion (14) from said access requests preventing access to said at least one identified register portion (14) in response to requests for access to the at least one register portion (14) detected by the access detection circuitry (200).

The method may include identifying at least one further register portion (14) in the semiconductor device (1) configured to have stored therein digital signals intended to have applied a bit masking pattern (214) in communication with the at least one further device (16), and activating (102) the register shield circuitry (100) in said register mask mode wherein, when activated in said register mask mode, the register shield circuitry (100) may allow access to said at least one further register portion (14) identified and may apply a bit masking pattern (214) to data (DB) returned in response to said requests for access by said at least one further register portion (14) identified.

A System on Chip (Soc) may be exemplary of a semiconductor device where embodiments can be advantageously applied.

One or more embodiments relate to a corresponding method.

One or more embodiments may provide a "post-silicon" mechanism to secure IP registers and fields.

One or more embodiments may define an enable/disable feature within decoding/addressing/bridging components of a register datapath.

One or more embodiments may be used to protect/block unsecure features in a secure context.

One or more embodiments may employ OTP (One Time Programmable) cells. These cells can be made available or are already available in an SoC in various forms (as electronic fuses, for instance). These cells can be programmed at production time to set up components (e.g., decoding, addressing and/or bridging components) of a register datapath. In that way, register accesses can be controlled (e.g., gated/write-masked/denied) selectively, with tunable granularity.

One or more embodiments may facilitate protecting (shielding) features not intended/desired to be publicly exposed. This may be because these features give rise to legacy issues and/or correspond to errors identified and fixed or due to legal reasons, such as a restriction indicating that a feature developed for one customer shall not be available to the mass market.

Similarly, security holes (e.g., bugs found in silicon and remedied) and/or features that can be regarded as legacy, old, and/or unspecified features or features designed for a different purpose may be desired to be excluded from mass market exposure.

One or more embodiments facilitate avoiding such unintended/undesired exposure.

In one or more embodiments, adequate remedy can be implemented without intervention of a design team for a new tape-out or re-design of the system, for instance.

In an embodiment, a semiconductor device comprises: a set of registers, which, in operation, store digital data; an interface coupled to the set of registers, wherein the interface, in operation, receives external requests to access registers of the set of registers; and selectively-activateable register shield circuitry, coupled between the interface and the set of registers. The register shield circuitry, once activated, intercepts requests received by the interface and directed to a register of the set of registers; determines whether an intercepted request is directed to a portion of a register of the set of registers to which access is prohibited; and responds to a determination that the intercepted request is directed to a portion of a register of the set of registers to which access is prohibited by preventing access to data stored in the portion of the register of the set of registers. In an embodiment, the semiconductor device comprises one-time-programmable, OTP cells configured to control activation of the register shield circuitry. In an embodiment, the one-time-programmable, OTP cells comprise electronic fuses. In an embodiment, the semiconductor device comprises interconnect circuitry including the interface and the register shield circuitry. In an embodiment, the interconnect circuitry has a protocol bridge and the register shield circuitry is included in said protocol bridge. In an embodiment, the register shield circuitry is included in an interconnect bridge or decoder in said interconnect circuitry. In an embodiment, the register shield circuitry has a register mask mode, and the register shield circuitry, in response to activation in the registry mask mode indicating a portion of a register of the set of registers is to be masked, in operation: in response to a request for access to the indicated portion of the register, applies a bit masking pattern to data returned in response to the request for access. In an embodiment, the bit masking pattern comprises logic inversion of selected ones of the bits in the data returned in response to the request. In an embodiment, the register stores a plurality of bits of data, and the portion of the register is a subset of bits of the plurality of bits. In an embodiment, the preventing access to data stored in the portion of the register of the set of registers comprising responding to the received request with dummy data.

In an embodiment, a method comprises: determining whether registry shield circuitry coupled between an interface of an integrated circuit and a set of registers of the integrated circuit has been activated; in response to a determination that the registry shield circuitry has been activated: intercepting requests received by the interface and directed to a register of the set of registers; determining whether an intercepted request is directed to a portion of a register of the set of registers to which access is prohibited; and responding to a determination that the intercepted request is directed to a portion of a register of the set of registers to which access is prohibited by preventing access to data stored in the portion of the register of the set of registers; and in response to a determination that the registry shield circuitry has not been activated, responding to requests received by the interface and directed to a register of the set of registers by accessing the register of the set of registers. In an embodiment, the method comprises activating the registry shield circuitry. In an embodiment, activating the registry shield circuitry comprises programming one-time-programmable, OTP cells. In an embodiment, the one-time-programmable, OTP cells comprise electronic fuses. In an embodiment, the register shield circuitry has a register mask mode indicating a portion of a register of the set of registers is to be masked; and the preventing access comprises applying a bit masking pattern to data returned in response to a request for access to the indicated portion of the register of the set of registers. In an embodiment, the register stores a plurality of bits of data, and the portion of the register is a subset of bits of the plurality of bits. In an embodiment, the preventing access to data stored in the portion of the register of the set of registers comprises responding to the received request with dummy data.

In an embodiment, a system comprises: a plurality of processing circuits, each including a set of registers, wherein the registers, in operation, store data; one or more interfaces, which, in operation, receive requests to access registers of the plurality of processing circuits; and a plurality of registry shield circuits coupled between processing circuits of the plurality of processing circuits and interfaces of the one or more interfaces, the plurality of registry shield circuits including a set of activated registry shield circuits and a set of unactivated registry shield circuits. An activated registry shield circuit of the set of activated registry shield circuits, in operation: intercepts received requests directed to registers of processing circuits coupled to the activated registry shield circuit; determines whether an intercepted request is directed to a portion of a register to which access is prohibited; and responds to a determination that the intercepted request is directed to a portion of a register to which access is prohibited by preventing access to data stored in the portion of the register. An unactivated registry shield circuit of the set of unactivated registry shield circuits, in operation, forwards received requests directed to registers of processing circuits coupled to the unactivated registry shield circuit to the respective processing circuits. In an embodiment, the system comprises an integrated circuit including the plurality of processing circuits, the one or more interfaces, and the plurality of registry shield circuits. In an embodiment, each registry shield circuit of the plurality of registry shield circuits comprises a plurality of one-time-programmable, OTP cells, which, in operation, store activation information associated with the register shield circuit.

In an embodiment, a non-transitory computer-readable medium's contents configure registry shield circuitry of an integrated circuit to perform a method, wherein the registry shield circuitry is coupled between an interface of an integrated circuit and a set of registers of the integrated circuit. The method comprises: determining whether the registry shield circuitry has been activated; in response to a determination that the registry shield circuitry has been activated: intercepting requests received by the interface and directed to a register of a set of registers; determining whether an intercepted request is directed to a portion of a register of the set of registers to which access is prohibited; and responding to a determination that the intercepted request is directed to a portion of a register of the set of registers to which access is prohibited by preventing access to data stored in the portion of the register of the set of registers. In an embodiment, the non-transitory computer-readable medium comprises a plurality of one-time-programmable, OTP cells, which, in operation, store the contents. In an embodiment, the contents comprise activation information associated with the registry shield circuitry. In an embodiment, the preventing access to data stored in the portion of the register of the set of registers comprises masking data of the portion of the register of the set of registers.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A semiconductor device, comprising:
a set of registers, which, in operation, store digital data;
an interface coupled to the set of registers, wherein the interface, in operation, receives external requests to access registers of the set of registers; and
selectively-activateable register shield circuitry, coupled between the interface and the set of registers, wherein the register shield circuitry, in response to activation, in operation:
intercepts requests received by the interface and directed to a register of the set of registers;
determines whether an intercepted request is directed to a portion of a register of the set of registers to which access is prohibited; and
responds to a determination that the intercepted request is directed to a portion of a register of the set of registers to which access is prohibited by preventing access to data stored in the portion of the register of the set of registers, wherein the preventing access to data stored in the portion of the register of the set of registers comprises applying a bit masking pattern to data returned in response to the request for access.

2. The semiconductor device of claim 1, comprising one-time-programmable, OTP cells configured to control activation of the register shield circuitry.

3. The semiconductor device of claim 2, wherein the one-time-programmable, OTP cells comprise electronic fuses.

4. The semiconductor device of claim 1, comprising interconnect circuitry including the interface and the register shield circuitry.

5. The semiconductor device of claim 4, wherein the interconnect circuitry has a protocol bridge and the register shield circuitry is included in said protocol bridge.

6. The semiconductor device of claim 4, wherein the register shield circuitry is included in an interconnect bridge or decoder in said interconnect circuitry.

7. The semiconductor device of claim 1, wherein the register shield circuitry has a register mask mode, and the register shield circuitry, in response to activation in the register mask mode indicating a portion of a register of the set of registers is to be masked, in operation:
in response to a request for access to the indicated portion of the register, applies the bit masking pattern to data returned in response to the request for access.

8. The semiconductor device of claim 1, wherein said bit masking pattern comprises logic inversion of selected ones of the bits in the data returned in response to the request.

9. The semiconductor device of claim 1, wherein the register stores a plurality of bits of data, and the portion of the register is a subset of bits of the plurality of bits.

10. The semiconductor device of claim 1, wherein the preventing access to data stored in the portion of the register of the set of registers comprising responding to the received request with dummy data.

11. A method, comprising:
determining whether registry shield circuitry coupled between an interface of an integrated circuit and a set of registers of the integrated circuit has been activated;
in response to a determination that the registry shield circuitry has been activated:
intercepting requests received by the interface and directed to a register of the set of registers;
determining whether an intercepted request is directed to a portion of a register of the set of registers to which access is prohibited; and
responding to a determination that the intercepted request is directed to a portion of a register of the set of registers to which access is prohibited by preventing access to data stored in the portion of the register of the set of registers; and
in response to a determination that the registry shield circuitry has not been activated, responding to requests received by the interface and directed to a register of the set of registers by accessing the register of the set of registers, wherein,
the register shield circuitry has a register mask mode indicating a portion of a register of the set of registers is to be masked; and
in the register mask mode, the preventing access comprises applying a bit masking pattern to data returned in response to a request for access to the indicated portion of the register of the set of registers.

12. The method of claim 11, comprising activating the registry shield circuitry.

13. The method of claim 12, wherein activating the registry shield circuitry comprising programming one-time-programmable, OTP cells.

14. The method of claim 13, wherein the one-time-programmable, OTP cells comprise electronic fuses.

15. The method of claim 11, wherein the register stores a plurality of bits of data, and the portion of the register is a subset of bits of the plurality of bits.

16. The method of claim 11, wherein the preventing access to data stored in the portion of the register of the set of registers comprises responding to the received request with dummy data.

17. The method of claim 11, wherein the bit masking pattern comprises logic inversion of selected ones of the bits in the data returned in response to the request.

18. A system, comprising:
a plurality of processing circuits, each including a set of registers, wherein the registers, in operation, store data;
one or more interfaces, which, in operation, receive requests to access registers of the plurality of processing circuits; and
a plurality of registry shield circuits coupled between processing circuits of the plurality of processing circuits and interfaces of the one or more interfaces, the plurality of registry shield circuits including a set of activated registry shield circuits and a set of unactivated registry shield circuits, wherein:
an activated registry shield circuit of the set of activated registry shield circuits, in operation:
intercepts received requests directed to registers of processing circuits coupled to the activated registry shield circuit;
determines whether an intercepted request is directed to a portion of a register to which access is prohibited; and
responds to a determination that the intercepted request is directed to a portion of a register to which access is prohibited by preventing access to data stored in the portion of the register; and an unactivated registry shield circuit of the set of unactivated registry shield circuits, in operation, forwards received requests directed to registers of processing circuits coupled to the unactivated registry shield circuit to the respective processing circuits, wherein, the activated register shield circuit has a register mask mode indicating a portion of a register of the set of registers is to be masked; and in the register mask mode, the preventing access comprises applying a bit masking pattern to data returned in response to a request for access to the indicated portion of the register of the set of registers.

19. The system of claim 18, comprising an integrated circuit including the plurality of processing circuits, the one or more interfaces, and the plurality of registry shield circuits.

20. The system of claim 18, wherein each registry shield circuit of the plurality of registry shield circuits comprises a plurality of one-time-programmable, OTP cells, which, in operation, store activation information associated with the register shield circuit.

21. The system of claim 18, wherein the bit masking pattern comprises logic inversion of selected ones of the bits in the data returned in response to the request.

22. A non-transitory computer-readable medium having contents which configure registry shield circuitry of an integrated circuit to perform a method, wherein the registry shield circuitry is coupled between an interface of an integrated circuit and a set of registers of the integrated circuit, the method comprising:

determining whether the registry shield circuitry has been activated;

in response to a determination that the registry shield circuitry has been activated:

intercepting requests received by the interface and directed to a register of a set of registers;

determining whether an intercepted request is directed to a portion of a register of the set of registers to which access is prohibited; and responding to a determination that the intercepted request is directed to a portion of a register of the set of registers to which access is prohibited by preventing access to data stored in the portion of the register of the set of registers, wherein the preventing access to data stored in the portion of the register of the set of registers comprises masking data of the portion of the register of the set of registers.

23. The non-transitory computer-readable medium of claim 22, comprising a plurality of one-time-programmable, OTP cells, which, in operation, store the contents.

24. The non-transitory computer-readable medium of claim 23 wherein the contents comprise activation information associated with the registry shield circuitry.

25. The non-transitory computer-readable medium of claim 22, wherein the masking data comprises logic inversion of selected ones of the bits in the data returned in response to the request.

\* \* \* \* \*